United States Patent
Roisman

(10) Patent No.: US 11,263,533 B2
(45) Date of Patent: Mar. 1, 2022

(54) DYNAMIC CONFIGURABLE RULE REPRESENTATION

(71) Applicant: SAP PORTALS ISRAEL LTD., Ra'anana (IL)

(72) Inventor: Pablo Roisman, Hod Hasharon (IL)

(73) Assignee: SAP Portals Israel Ltd., Ra'anana (IL)

( * ) Notice: Subject to any disclaimer, the term of this patent is extended or adjusted under 35 U.S.C. 154(b) by 902 days.

(21) Appl. No.: 16/033,944

(22) Filed: Jul. 12, 2018

(65) Prior Publication Data
US 2020/0019866 A1    Jan. 16, 2020

(51) Int. Cl.
| | | |
|---|---|---|
| G06N 5/02 | (2006.01) | |
| G06F 40/284 | (2020.01) | |
| G06F 3/04847 | (2022.01) | |
| G06F 40/242 | (2020.01) | |
| G06F 8/41 | (2018.01) | |

(52) U.S. Cl.
CPC ......... *G06N 5/022* (2013.01); *G06F 3/04847* (2013.01); *G06F 8/427* (2013.01); *G06F 40/242* (2020.01); *G06F 40/284* (2020.01)

(58) Field of Classification Search
CPC ..... G06N 5/022; G06F 40/284; G06F 40/242; G06F 8/427; G06F 40/166
USPC .................... 715/200, 227; 706/46
See application file for complete search history.

(56) References Cited

U.S. PATENT DOCUMENTS

| | | | | |
|---|---|---|---|---|
| 5,991,713 A * | 11/1999 | Unger | ................... | G06F 40/221 704/9 |
| 6,016,477 A * | 1/2000 | Ehnebuske | .......... | G06Q 10/063 705/7.11 |
| 7,343,364 B2 * | 3/2008 | Bram | ..................... | G06N 5/043 706/47 |
| 8,370,272 B2 | 2/2013 | Wickel et al. | ................ | 705/342 |
| 8,458,487 B1 * | 6/2013 | Palgon | ................ | H04L 63/0807 713/185 |
| 9,589,232 B2 * | 3/2017 | Gould | ....................... | G06N 5/04 |
| 2003/0090514 A1 * | 5/2003 | Cole | ....................... | G06Q 10/10 715/744 |
| 2003/0115039 A1 * | 6/2003 | Wang | ..................... | G06F 40/211 704/4 |
| 2004/0226027 A1 * | 11/2004 | Winter | ...................... | G06F 8/20 719/328 |
| 2006/0259603 A1 * | 11/2006 | Shrader | .................. | H04L 67/28 709/223 |
| 2008/0177689 A1 * | 7/2008 | Jeng | ....................... | G06Q 30/00 706/47 |
| 2009/0113387 A1 * | 4/2009 | Ziegler | .............. | G06Q 30/0244 717/109 |
| 2010/0131399 A1 * | 5/2010 | Anand | ................... | G06Q 40/00 705/35 |
| 2014/0282373 A1 * | 9/2014 | Garza | ....................... | G06F 8/51 717/106 |
| 2015/0262128 A1 * | 9/2015 | Kidron | .............. | G06Q 10/0633 705/342 |

(Continued)

*Primary Examiner* — Manglesh M Patel
(74) *Attorney, Agent, or Firm* — Fish & Richardson P.C.

(57) ABSTRACT

A rule is received at a client application from an input text control. The received rule includes a sequence of characters and is parsed into a plurality of tokens. For each of the tokens, a plurality of behaviors associated with that token are configured to generate a behavior configuration. Each of the generated behavior configurations can be modified by an authorized user. A user interface (UI) control is generated based on the behavior configurations.

20 Claims, 9 Drawing Sheets

(56) References Cited

U.S. PATENT DOCUMENTS

2016/0373456 A1\* 12/2016 Vermeulen ............ G06F 16/245
2019/0370325 A1\* 12/2019 Dasgupta .............. G06F 40/295

\* cited by examiner

```xml
<?xml version="1.0" encoding="utf-8" standalone="yes"?>
<entry xml:base="http://localhost:999/dataservice/$metadata/"
    xmlns:d="http://schemas.microsoft.com/ado/2007/08/dataservices"
    xmlns:m="http://schemas.microsoft.com/ado/2007/08/dataservices/metadata"
    xmlns="http://www.w3.org/2005/Atom">
  <id>http://localhost:999/dataservice/$metadata/ResourceTypes('Namespace.Product')</id>
  <title type="text"></title>
  <updated>2010-04-21T17:34:41Z</updated>
  <author>
     <name />
  <author>
  <link rel="edit" title="ResourceType" href="ResourceTypes('Namespace.Product')" />
  <link rel="http://schemas.microsoft.com/ado/2007/08/dataservices/related/BaseType"
      type="application/atom+xml;type=entry"
      title="BaseType"
      href="ResourceTypes('Namespace.Product')/BaseType" />
  <link rel= http://schemas.microsoft.com/ado/2007/08/dataservices/related/Properties
      type="application/atom+xml;type=feed"
      title="Properties"
      href="ResourceTypes('Namespace.Product')/Properties" />
  <category term="System.Data.Services.Providers.ResourceType"
      scheme="http://schemas.microsoft.com/ado/2007/08/dataservices/scheme" />
  <content type="application/xml">
    <m:properties>
      <d:FullName>Namespace.Product</d:FullName>
      <d:Name>Product</d:Name>
      <d:Namespace>Namespace</d:Namespace>
      <d:InstanceType>OData.WebApp.Product</d:InstanceType>
      <d:IsAbstract m:type="Edm.Boolean">false</d:IsAbstract>
      <d:IsMediaLinkEntry m:type="Edm.Boolean">false</d:IsMediaLinkEntry>
      <d:IsOpenType m:type="Edm.Boolean">false</d:IsOpenType>
      <d:ResourceTypeKind>EntityType</d:ResourceTypeKind>
    </m:properties>
  </content>
</entry>
```

FIG. 3

| Token | Visible | Text | Values | UI Control | Order index |
|---|---|---|---|---|---|
| Rating of the employee | true | Rating | | Text | 1 |
| is more than | true | NA | [is equal to, is more than] | dropdown | 2 |
| 8 | true | NA | Range[6-10] | Positive Number input | 3 |
| and | false | | | | --- |
| User of the employee | false | | | | --- |
| Starts with | false | | | | --- |
| 'i' | false | | | | --- |

| If rating of the employee is more than 8 and user of the employee starts with 'i' |

Parse and present results in table maintained by customer

| Token | Visible | Text | Values | UI Control | Order index |
|---|---|---|---|---|---|
| Rating of the employee | true | Rating | | Text | 1 |
| is more than | true | NA | [is equal to, is more than] | dropdown | 2 |
| 8 | true | NA | Range[6-10] | Positive Number input | 3 |
| and | false | | | | --- |
| User of the employee | false | | | | --- |
| Starts with | false | | | | --- |
| 'i' | false | | | | --- |

*602a* ↓ Generated ui control

Rating [is more than ▽] [8]

FIG. 6A

If rating of the employee is more than 8 and user of the employee starts with 'i'

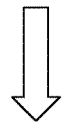

Parse and present results in table maintained by customer

| Token | Visible | Text | Values | UI Control | Order index |
|---|---|---|---|---|---|
| Rating of the employee | true | Rating | | Text | 1 |
| is more than | true | NA | [is equal to, is more than] | dropdown | 2 |
| 8 | true | NA | Range[6-10] | Positive Number input | 3 |
| and | true | AND | | Text | 4 |
| User of the employee | true | user | | Text | 7 |
| Starts with | true | Is | | Text | 5 |
| 'i' | true | | [I,C] | Multiple selection | 6 |

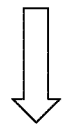

Generated ui control

602b

Rating | is more than ▽ | 9 | AND is | C,I ▽ | user

| If rating of the employee is more than 8 and user of the employee starts with 'i' |

Parse and present results in table maintained by customer

| Token | Visible | Text | Values | UI Control | Order index |
|---|---|---|---|---|---|
| Rating of the employee | true | ציון | | Text | 1 |
| is more than | true | NA | [שווה, מעל] | dropdown | 2 |
| 8 | true | NA | Range[6-10] | Positive Number input | 3 |
| and | false | | | | --- |
| User of the employee | false | | | | --- |
| Starts with | false | | | | --- |
| 'i' | false | | | | --- |

Generated ui control

*602c*

| 8 | ציון העובר מעל ▽ |

FIG. 6C

DYNAMIC CONFIGURABLE RULE REPRESENTATION

BACKGROUND

Business rule languages empower technical and business users to change rules and calculations in applications with less effort, cost, and without extensive programming skills. Business rule management applications facilitate a nexus between a business rule with syntax and the syntax used in daily work of an enterprise. An essential function of systems based on business rule is the partial or complete separation of business logic from application code so that professional staff can design, model, and maintain the business rule.

SUMMARY

The present disclosure describes methods and systems, including computer-implemented methods, computer program products, and computer systems for dynamic configurable rule representations.

In an implementation, a rule is received at a client application from an input text control. The received rule includes a sequence of characters and is parsed into a plurality of tokens. For each of the tokens, a plurality of behaviors associated with that token are configured to generate a behavior configuration. Each of the generated behavior configurations can be modified by an authorized user. A user interface (UI) control is generated based on the behavior configurations.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this disclosure can be implemented to realize one or more of the following advantages. The generated rule language provides a uniform and user-friendly experience from which a user can execute different types of services naturally and intuitively. In addition, a generated configurable rule control provides advanced rendering capabilities and built-in validation logic, therefore reducing application development effort and costs. Further, the generated configurable rule control can be easily placed in applications, where the rule control can be adapted to different users or computing devices based on specific needs, such as for different user roles or language preferences. The configurable rule control also permits translation capabilities. For example, the rule control format, language, or arrangement can be adapted dynamically based on a geographical region, user attributes or preferences, a computing device configuration, or other considerations consistent with this disclosure.

The details of one or more implementations of the subject matter of this disclosure are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

FIG. 3 is a screenshot illustrating an example descriptor file, according to some implementations of the present disclosure.

FIG. 5 is a screenshot of an example table control generated by the disclosed method according to an implementation of the present disclosure.

FIGS. 6A-6C are screenshots of example UI controls generated based on behavior configurations, according to an implementation of the present disclosure.

Like reference numbers and designations in the various drawings indicate like elements.

DETAILED DESCRIPTION

Figure 1:
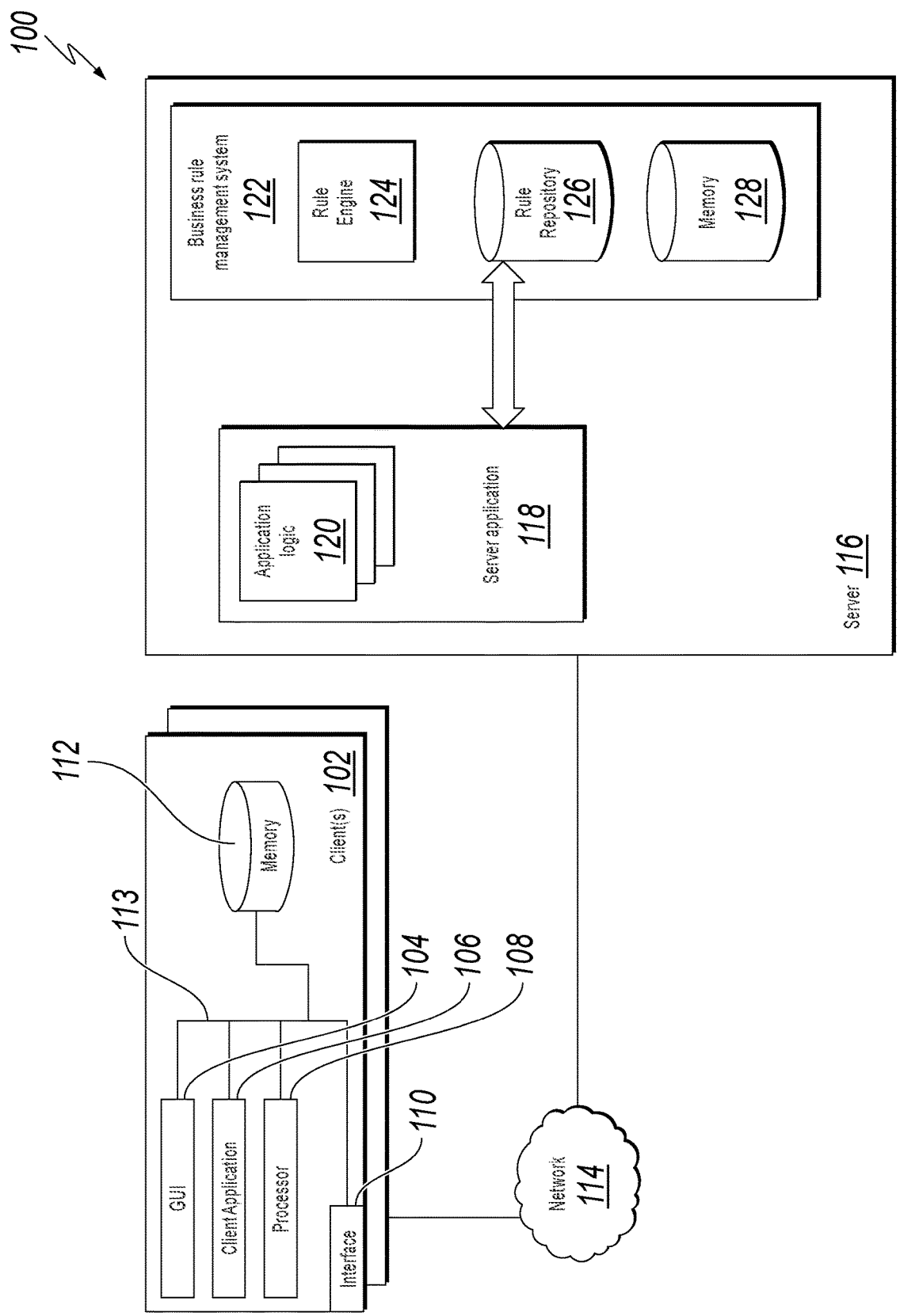
FIG. 1 is a block diagram illustrating an example environment system for executing a client request based on a business rule, according to an implementation of the present disclosure.

The following detailed description describes generating dynamic configurable rule representations and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Business rules are governing guidelines for business and enterprise operations. Such rules can be created based on regulations, industry standards, or policies of an individual enterprise. For example, a simple business rule may set forth that a discount can be given to customers that have a credit score higher than a certain number. Because changes are frequently made within and outside the enterprise, business rules have to be continuously created and modified by enterprise authorized personnel, such as an administrator or a manager. In some implementations, business rules can be expressed (for example, formatted) as programming code, or in a user-friendly format, allowing a user to change a business rule through a user interface (UI) without a need for knowledge of, or to perform, extensive software development (that is, programming).

Business rule-based applications include software that utilizes business rules. One common component of the business rule-based applications is a business rule engine, which provides a nexus between the business rule-based applications and related business rules. Conventionally, application developers are required to integrate business logic directly into applications that they develop for a particular purpose, for example, applications written for tax or discount calculations. When there is a change in the business rules, the application developers need to make changes application code (or code).

The business rule engine allows the code of a business rule-based application to be stored separately from an associated business rule. Therefore, a user from an enterprise can change the associated business rule with minimal informational technology (IT) intervention through a business rule design component of the business rule engine.

Developed business rules transmitted through networks are required to conform to one or more web protocols. For example, the Open Data Protocol (OData) is a web protocol for querying and updating data over a network. OData allows a user to request data from a data source using the Hypertext Transfer Protocol (HTTP) and to receive results back from the data source in formats such as Atom Publishing Protocol (Atom), JAVASCRIPT Object Notation (JSON), and Extensible Markup Language (XML). The OData protocol is increasingly used by various computing platforms, such as mobile devices and desktop computers, and is becoming an important method of accessing information over networks.

Developing rule languages that conform to web protocols, however, is challenging for users not equipped with extensive programming experience. First, software-development tools tend to be developer-oriented and require technical ability. An application might require multiple steps and interactions to perform a task. Developing an application requires resources. A user may not be exposed to all possible functionality associated with a business rule because of a lack of experience with a business rule language. Therefore, a business rule language that can provide a uniform and friendly user experience so that the user can execute different types of services associated with the business rule language in a natural and intuitive manner, reducing application development effort and cost.

Additionally, a generated language control based on the business rule may not always be suited to various needs of application users. For example, an administrator may wish to present a particular rule in different configurations, so that different users (such as, users with different roles within the enterprise) can view a particular UI control presenting the business rule with a particular configuration that fits particular roles and needs. Also, different computing devices, such as with different settings or location regions, may also require that the same business rule be represented differently in UI controls.

To solve these problems, this disclosure describes a method of generating different rule representations to permit configuration of business rules. The proposed method can reduce development efforts by creating a service-specific rule language and generating a configurable rule representation that can be accessed through a UI control that provides advanced rendering capabilities and built-in validation logic. With the disclosed approach, users with limited knowledge of business rule-based application development can develop desired business rules, and configure the business rules according to different needs of users and computing devices. For example, generated configurable rule representations can be configured for particular users based on rank or role in an enterprise or settings of computing devices based on specifications particular to the computing devices (such as, display resolution or orientation).

FIG. 1 is a block diagram illustrating an example distributed computing system (EDCS) 100 for executing a client request based on a business rule. The EDCS 100 includes or is communicably coupled with a server 116, one or more clients 102, and a network 114 connecting the server 116 and the one or more clients 102. In some implementations, one or more components of the EDCS 100 may be configured to operate as part of a cloud-based computing environment.

A client 102 may be any computing device operable to connect to or communicate with at least the server 116. In some implementations, the client 102 includes an electronic computing device operable to receive, transmit, process, and store any appropriate data associated with the EDCS 100. Among other things, the client 102 can collect content from the client 102 and upload the collected content to the server 116 for processing by a server application 118. The client 102 typically includes a graphical user interface (GUI) 104, a processor 108, a client application 106, a memory 112, and an interface 110 communicating over a system bus 113.

In some implementations, the client application 106 can use parameters, metadata, and other information received at launch to access a particular set of data from the server 116. Once a particular client application 106 is launched, a user may interactively process a task, event, or other information associated with the server 116. For example, the client application 106 can generate and transmit a particular message (for example, a database request or a request for content) to the server 116. In some implementations, the message can be sent to the server 116 by a user typing a text entry using GUI 104 generated by client application 106 (for example, by clicking a "submit" button on the GUI 104). The client application 106 executes a request received from the GUI 104 (for example, by clicking the "submit" button") and communicates the request to the server 116 using the network 114 (for example, using the OData web protocol). The client application 106 also allows the client to navigate to/from, request, view, create, edit, delete, administer, or manipulate content associated with the server 116. For example, the client application 106 can present data to a user that is generated/transmitted by the server 116 through the GUI 104.

In some implementations, a rule engine 124 of a business rule management system 122 can be used to divide a business rule into separate tokens and match each token to a particular grammar rule (for example, a business grammar rule) by a client-side lexer and parser (not illustrated), which are included in client application 106. Behaviors (for example, visibility, value, and text) of each token can be configured to different values by and administrator, and configuration values can be used as parameters for the GUI 104. In some implementations, the process of dividing a rule into tokens and matching each token to a particular grammar rule can be performed by a server-side lexer and parser (not illustrated), which are included in the rule engine 124. In some implementations, the client-side lexer and parser can be a component that can be deployed in either a client or a server environment (for example, client 102 or server 116.

The GUI 104 can be configured for different representations based on different rule configurations. In some implementations, each GUI representation can be associated with a particular type of user (for example, a user that has a certain role within the enterprise). In some implementations, each GUI representation can also be associated with a particular type of computing device, for example, a client 102 located in a particular region.

At a high level, the server 116 is an electronic computing device operable to receive, transmit, process, store, or manage data and information associated with the EDCS 100. In some implementations, the server 116 may also include, or be communicably coupled with, an e-mail server, a web server, a caching server, a streaming data server, a business intelligence (BI) server, or other server. The server 116 is responsible for receiving, among other things, requests or content from one or more client applications 106 associated with the client 102 of the EDCS 100 through the network 114.

Once a request reaches the server 116, the request is processed by the server application 118. In some implementations, the server application 118 can provide or modify content received from the client 102 and be made available to other components of the EDCS 100. In other words, the server application 118 can act in conjunction with one or more components of the server 116 or EDCS 100 in responding to a message (such as, a request) for content received from the client 102. For example, the server application 118 can process the request and write data or data sets contained in the request into memory 128 of a business rule management system 122.

The business rule management system 122 contains a rule repository 126 that stores various business rules, and the business rule engine 124 that determines which business rules stored in the rule repository 126 are relevant to the data or data sets contained in the request. The business rule engine 124 can automatically select data from the memory 128 and also select a corresponding business rule from the business rule repository 126 to execute. Results from executing business rules are returned to the server application 118. In response to the received results, the server application 118 can generate application content based on the results and communicate the application content back to the client application 106. The business rule engine 124 is responsible for dividing a stored business rule into tokens. After the business rule engine 124 divides the business rule into tokens and matches each token to a particular grammar rule with a parser. The parsing is used to generate business rule UI representations. The business rule engine 124 can send the configured business-rule UI representations to the client application 106, which presents the received business-rule UI representations on the GUI 104. The business rule engine 124 is expected to exhibit performance comparable to an application developer without an ability to use the business rule engine 124.

Figure 2:
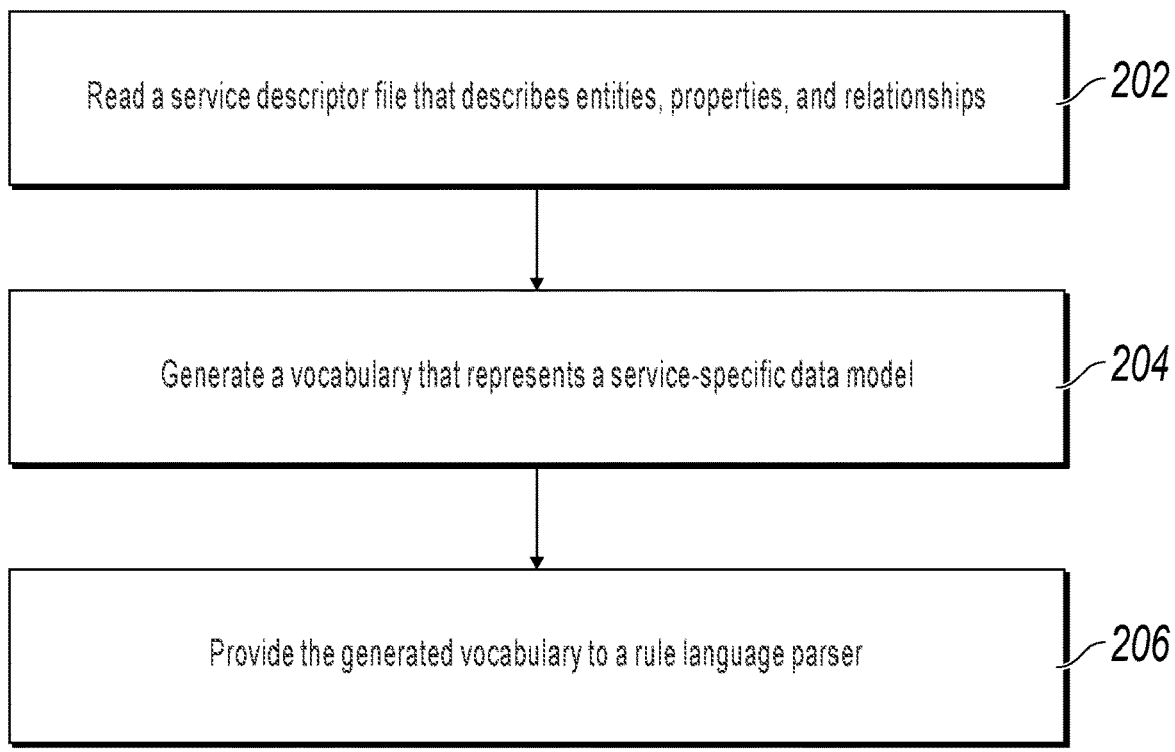
FIG. 2 is a flowchart illustrating an example of a computer-implemented method for generate a service-specific rule language, according to an implementation of the present disclosure.

FIG. 2 is a flowchart illustrating an example of a computer-implemented method 200 for generating a service-specific business rule language, according to an implementation of the present disclosure. For clarity of presentation, the method 200 will be described by FIG. 2 in conjunction with FIG. 3.

A business rule language is constructed from two parts: parser rules and a vocabulary. Parser rules define structure and syntax of the business rule language and static cross applications and services. Syntactic rules define possible actions and operations based on a business data type, such as, number, string, or timestamp. For example, "Get <object name>" that <number> is greater than/is less than/equal to <number>" is a syntactic rule. Vocabulary represents an application or service-specific data model. Because syntax for all services is the same, and only vocabulary changes, the key for generating a service-specific business language is generating a service-specific vocabulary. Since the service-specific request is associated with a metadata descriptor, it is possible to read metadata information and generate a service-specific vocabulary.

For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

At 202, a service descriptor file is received by the EDCS 100 using a front end. In some implementations, the front end can be a client application 106 on client 102. The received service descriptor can be based on a service type selected by a user. A service descriptor file is used to inform a web service provider of expected services. In other words, a service descriptor file is used to describe a message exchanged between a web service provider and a consumer. For example, a requested service can be one that retrieves a purchase order. In some implementations, a service descriptor file can be formatted in JSON or XML, format.

Referring to FIG. 3, FIG. 3 is a screenshot illustrating an example service descriptor file, according to some implementations of the present disclosure. The service descriptor file in this example is used in OData services. OData exposes a service document that lists all top-level feeds so that clients can discover feeds and addresses of the feeds. The exposed service descriptor file describes entities, properties, and relationships. The service document is typically available at a Service Root uniform resource identifier (URI) and may be formatted in JSON. Typically, an OData request can be provided as a URL that includes one or more of various supported OData options, but, in other implementations, OData requests can also be structured in other appropriate formats.

The following are example URLs used as SELECT statements:

http://example.services.odata.org/ODataExample/OData.svc/Categories(1)/Products http://example.services.odata.org/ODataExample/OData.svc/Categories(1)/Products/$count http://example.services.odata.org/ODataExample/OData.svc/Categories(1)/Products(1)/Supplier/Address/City/$value http://example.services.odata.org/ODataExample/OData.svc/Categories?$ expand=Products.

As illustrated in FIG. 3, a user wants to get information for the Product type, so a request is constructed in the form "GET http://localhost:999/dataservice/$metadata/ResourceTypes('Namespace.Product')". After the system receives the request, it can retrieve a service descriptor file (where a descriptor is service metadata) by visiting the URL contained in the request. Once the service descriptor file is found, the EDCS 100 can return the service descriptor file as shown in FIG. 3, where the service descriptor file provides metadata information about a product with links to properties and a base type. The service descriptor file can be processed (for example, using a client parser, which is part of the client application 106) to extract the metadata information.

Returning to FIG. 2, at 204, a vocabulary is generated. In OData, for example, a vocabulary is a namespace containing terms, where each term is named a metadata extension for an OData service. A vocabulary object and a service descriptor file have a similar structure that describes a data object, properties, and associations between the data object and other data objects. The service descriptor file can be parsed to create a particular vocabulary object in a required structure. In some implementations, the metadata extracted from the parsed metadata file can be mapped to a vocabulary.

A vocabulary can be generated that is specific to a scenario, and commonly used terms can be added to share vocabularies such as OData core vocabularies. Table 1 illustrates the generated vocabulary. In this example, the service descriptor file contains information about a product the user wishes to order, such as product type, properties, and base type. As illustrated, the generated vocabulary contains three objects: a purchase order, a purchase order item, and a product. For each object, there are key behaviors associated with that object. For example, the key behaviors associated with a purchase order can be its ID, order date, and a total amount to be ordered. Each behavior is also defined and described, as shown in the third column of the table.

TABLE 1

Generated Vocabulary

| Objects | Term | Term Description |
| --- | --- | --- |
| Purchase order | Id | string |
| | Date | timestamp |
| | Total amount | number |
| Purchase order item | Id | string |
| | Product id | string |
| | Units | number |
| Product | Id | string |
| | Name | string |
| | Price | number |

At 206, the generated vocabulary is provided with a business language parser to generate a service-specific business language. In this example, based on the syntactic rule "Get <object name> that <number> is greater than/is less than/equal to <number>", a user can execute the query "Get Purchase order that units of Purchase order item is greater than 50". Specifically, the query expression can first be parsed in the client parser, then each token of the parsed expression can be set according to a property type in the vocabulary. In this way, the expression language can be service-type specific.

Figure 4:
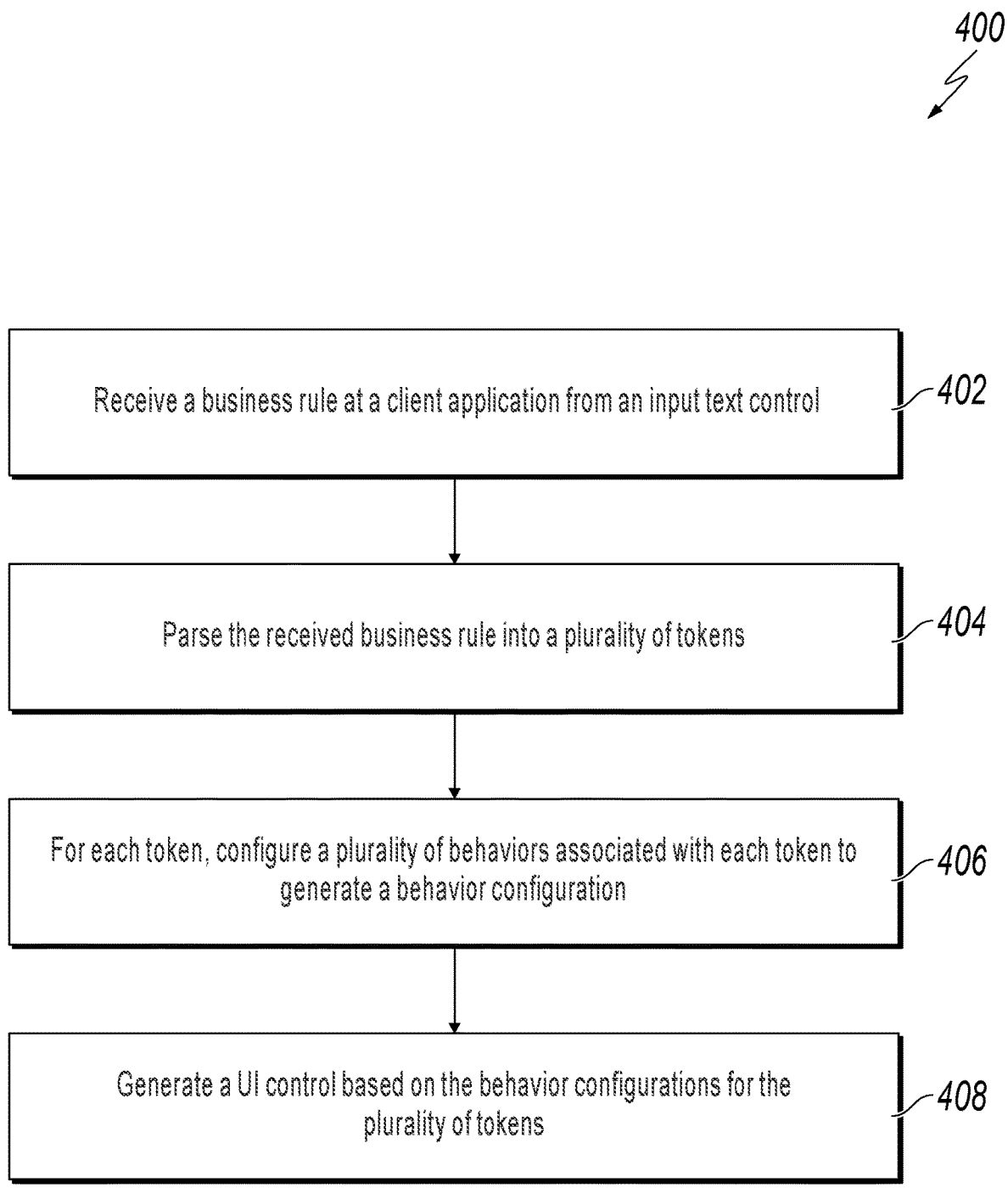
FIG. 4 is a flowchart illustrating an example of a computer-implemented method for generating a dynamic configurable rule according to an implementation of the present disclosure.

FIG. 4 is a flowchart illustrating an example of a computer-implemented method 400 for generating a dynamic configurable rule representation, according to an implementation of the present disclosure. For illustration purposes, the to-be-configured rule in this implementation is a business rule providing a bonus for employees with high ratings. The business rule can be represented as "rating of the employee is more than 8 and user of the employee starts with 'I'". A configured rule control, for example, a UI control, can be easily placed in an application and instantiated with an appropriate configuration according to one or more particular users (such as, a role or a ranking of a user within an enterprise, a locale of the user, or application section), or computing devices. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

At 402, a business rule is received at a client application from an input text control. The received business rule comprises a sequence of characters. The input text control can be a text input box located on the user interface. In some implementations, the received rule can be generated by the method 200 as described in FIG. 2. The rule can be a service-specific business rule generated based on a service-specific vocabulary, for example, the business rule can be related to distributing bonuses to employees based on employee ratings. The service-specific vocabulary contains a plurality of objects and associated behaviors. From 402, method 400 proceeds to 404.

At 404, the received rule is divided into a plurality of tokens (syntactic parts) using the business language capabilities. In this step, an input character stream is split into meaningful symbols defined by a grammar of regular expressions. This step comprises two sub-steps: tokenize and parse.

In the tokenize step, which also can be referred to as a lexical analysis step, the received rule is divided into a sequence of tokens. This step can be performed by a program called a lexer or a tokenizer. A lexer is generally combined with a parser, which together analyze syntax of a programming language. Tokens are basic units of the syntax, such as operators, keywords, and constants. A token generally comprises a token name and an optional token value. All the tokens are defined in a language token list. The process of tokenization often comprises scanning and evaluation, during which the lexer segments the input string into syntactic units and categorizes them into token classes. For example, a calculator program would look at an input, such as a business rule of providing a bonus for employees with a high rating can be represented as "rating of the employee is more than 8 and user of the employee starts with 'I'", and splits the business rule into tokens "Rating of the employee", "is more than", "8", and "user of the employee", "starts with", and "I".

In the parse step, each of the sequence of tokens is read and matched to at least one of grammar rule. This step can be performed by a parser, which is a software component that takes input data and builds a data structure, providing an internal structural representation of the input data while checking for whether the tokens form an allowable expression. Using business language capabilities, in some implementations, the parser can be a business rule parser that matches each token to a business grammar rule, for example, a business grammar rule specifies "Compare numeric attribute to a number and verify a character on an attribute of type string".

In an implementation, since the vocabulary portion of the language is dynamic and the lexer is not able to expect tokens derived from the vocabulary, the method used for parsing can include: while analyzing the input stream, the lexer determines if a token is derived from the vocabulary provided. If the determination is YES, the token type is set according to the vocabulary property type (for example, the token is "customer age" and the property is set to a numeric property type from the vocabulary). In this way, a business language can be made type-aware.

At 406, for each token, a plurality of behaviors associated with that token are configured to generate a behavior configuration for the token, where each generated behavior configuration can be modified by a user. In some implementations, the behaviors applicable for each token can be one or more of visibility, order, text, value range, and a corresponding control. In some implementations, some behaviors may not be applicable to all tokens. For example, if the visibility of the token "is more than" is configured to "true", and the UI control is configured to "dropdown", in a generated UI control (discussed in more detail in the next two steps), the token "is more than" can appear in the UI control and in a form of a drop-down window.

In some implementations, each token and the behavior configuration associated with the token are presented in a table control representing the behavior configuration. Each row of the table control represents a token and behavior configuration associated with the token. The behavior configuration associated with a token provide corresponding controls associated with the token that appear in the UI control. In some implementations, the table control is maintained and individual values can be modified by an authorized user. In some cases, the authorized user can be a developer, an administrator, or any authorized personnel with authority within the enterprise to make the described changes.

At 408, a UI control is generated based on the behavior configurations for the plurality of tokens, wherein a representation of the UI control can be changed by the authorized user. In some implementations, each element of the generated UI control corresponds to a token. Because the behavior configuration associated with each token can be modified by the authorized user, and because the UI control is generated based on the behavior configurations for the plurality of tokens, whenever the authorized user creates a new behavior configuration associated with one or more tokens, a different representation of the UI control can be generated. That is, from a client, the client's view of the UI control is changed if an authorized user modifies one or more behavior configurations.

The behavior configuration values are used as parameters of the UI control, which renders a business rule according to the configuration and manages value validations and translation to a business language structure. The UI control can be placed in an application and instantiated with the appropriate configuration according to, for example, user role, locale, or application section. The UI control can provide advanced rendering capabilities and built-in validation logic, different configurations with respect to the same rule, and enablement of the application to fit different needs for users according to different parameters.

FIG. 5 is a screenshot of an example table control 500 generated by method 400, according to an implementation of the present disclosure. In this case, for illustration purpose, assuming the rule is "If rating of the employee is more than 8 and user of the employee starts with 'I'". In FIG. 5, each row of the table control represents a token and a behavior configuration associated with that token. As illustrated in FIG. 5, the rule "If rating of the employee is more than 8 and user of the employee starts with 'I'" is broken into seven tokens, "rating of the employee" 514, "is more than" 516, "8" 518, "and" 520, "User of the employee" 522, "starts with" 524 and "I" 526. The seven tokens are listed under the Token 502 in column 1 of the table. Each of the tokens are associated with multiple behaviors, which are "visible" 504, "text" 506, "values" 508, "UI control" 510, and "order index" 512. Each of the behaviors can be configured to a value appropriate to an associated token. For example, the visibility behavior (Visible 504) associated with the tokens in the first three rows are configured to the same value "true," which means these tokens will appear in a generated UI control. Each of the behavior configurations can be modified by an administrator or other authorized user based on the role of the user or other settings to generate different representations for the same rule, as will be discussed further in FIGS. 6A-6C.

FIGS. 6A-6C are screenshots of example UI controls 600a-600c, respectively, generated based on behavior configurations, according to an implementation of the present disclosure. For illustration purpose, as an example, the same rule applies: "If rating of the employee is more than 8 and user of the employee starts with 'I'" is broken into the same seven tokens "rating of the employee," "is more than," "8," "and," "User of the employee," "starts with," and "I". Each figure shows a table control generated by method 400.

In FIG. 6A, the business rule is configured to be viewed and operated by a team manager role, and the team manager role is only authorized to set a minimum rating. A UI control 602a is generated based on the behavior configurations as those shown in FIG. 5. As can be seen in FIG. 6A, the generated UI control 602a allows the team manager role for only one authorized operation (that is, changing the minimum rating "8" in the UI control). The team manager can enter any number from 6 to 10 in that input box if she wishes to make any changes to the minimum rating.

In FIG. 6B, the business rule is configured to be viewed and operated by a group manager role, and this group manager role has broader authorizations than the team manager in last example. For this case, the group manager can change the minimum rating, and also change the type of the employee to include employees whose name starts with a "C". To grant the group manager such authorization, an administrator first generates a set of new configurations for corresponding tokens. As can be seen in FIG. 6B, the table control shown in FIG. 6B is different from the table control shown in FIG. 5B, such as, the behavior configurations of the token "and," "User of the employee," "starts with," and "I" have been changed. For example, the visibility configuration of these three tokens have been changed from "false" to "true," which means these tokens will appear in the generated UI control. So in the generated UI control 602b, a UI Control portion that allows the group manager to change the type of employee is added. Through the UI control 530, the group manager can set the minimum rating, and also can select the user of the employee starts with "I, C" "C," and "I" through a multiple selection pulldown UI Control.

In FIG. 6C, the business rule is configured to be viewed and operated from a region using a particular language. This may be to suit the needs of the user or the enterprise that is located in a particular region, or to adapt to a computing device used to access the UI control. In this case, for example, the user, regardless of their role in the enterprise, wishes to access a UI control that is presented in Hebrew. To allow the user to view the UI control in Hebrew, the administrator generates a set of new behavior configurations for corresponding tokens. As can be seen in FIG. 6C, compared to the table control shown in FIG. 5, the value of the behavior configuration corresponding to the token "is more than" is changed from "is equal to, is more than" to " מ יותר, ל שווה ". In the generated UI control 602c, the portion that allows the user to set the minimum rating of employee is presented in the Hebrew language, and through the UI control 602c, a user who speaks Hebrew can set up the minimum rating of the employee and also set an input number in Hebrew.

Figure 7:
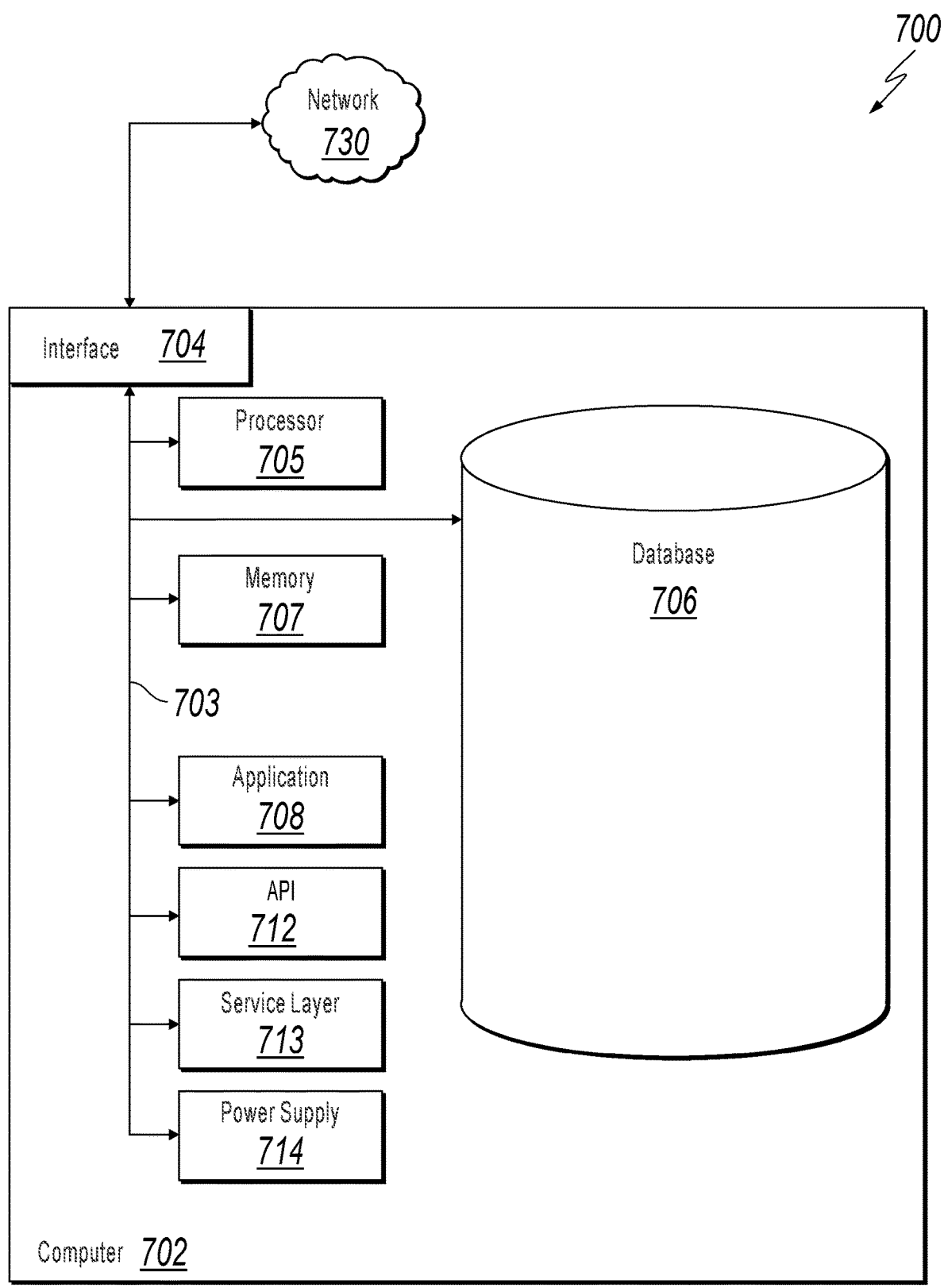
FIG. 7 is a block diagram illustrating an example of a computer-implemented system used to provide computational functionalities associated with described algorithms, methods, functions, processes, flows, and procedures, according to an implementation of the present disclosure.

FIG. 7 is a block diagram illustrating an example of a computer-implemented System 700 used to provide computational functionalities associated with described algorithms, methods, functions, processes, flows, and procedures, according to an implementation of the present disclosure. In the illustrated implementation, System 700 includes a Computer 702 and a Network 730.

The illustrated Computer 702 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 702 can include an input device, such as a keypad, keyboard, touch screen, another input device, or a combination of input devices that can accept user information, and an output device that conveys information associated with the operation of the Computer 702, including digital data, visual, audio, another type of information, or a combination of types of information, on a graphical-type user interface (UI) (or GUI) or other UI.

The Computer 702 can serve in a role in a distributed computing system as a client, network component, a server, a database or another persistency, another role, or a combination of roles for performing the subject matter described in the present disclosure. The illustrated Computer 702 is communicably coupled with a Network 730. In some implementations, one or more components of the Computer 702 can be configured to operate within an environment, including cloud-computing-based, local, global, another environment, or a combination of environments.

At a high level, the Computer 702 is an electronic computing device operable to receive, transmit, process, store, or manage data and information associated with the described subject matter. According to some implementations, the Computer 702 can also include or be communicably coupled with a server, including an application server, e-mail server, web server, caching server, streaming data server, another server, or a combination of servers.

The Computer 702 can receive requests over Network 730 (for example, from a client software application executing on another Computer 702) and respond to the received requests by processing the received requests using a software application or a combination of software applications. In addition, requests can also be sent to the Computer 702 from internal users (for example, from a command console or by another internal access method), external or third-parties, or other entities, individuals, systems, or computers.

Each of the components of the Computer 702 can communicate using a System Bus 703. In some implementations, any or all of the components of the Computer 702, including hardware, software, or a combination of hardware and software, can interface over the System Bus 703 using an application programming interface (API) 712, a Service Layer 713, or a combination of the API 712 and Service Layer 713. The API 712 can include behaviors for routines, data structures, and object classes. The API 712 can be either computer-language independent or dependent and refer to a complete interface, a single function, or even a set of APIs. The Service Layer 713 provides software services to the Computer 702 or other components (whether illustrated or not) that are communicably coupled to the Computer 702. The functionality of the Computer 702 can be accessible for all service consumers using the Service Layer 713. Software services, such as those provided by the Service Layer 713, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 702, alternative implementations can illustrate the API 712 or the Service Layer 713 as stand-alone components in relation to other components of the Computer 702 or other components (whether illustrated or not) that are communicably coupled to the Computer 702. Moreover, any or all parts of the API 712 or the Service Layer 713 can be implemented as a child or a sub-module of another software module, enterprise application, or hardware module without departing from the scope of the present disclosure.

The Computer 702 includes an Interface 704. Although illustrated as a single Interface 704, two or more Interfaces 704 can be used according to particular needs, desires, or particular implementations of the Computer 702. The Interface 704 is used by the Computer 702 for communicating with another computing system (whether illustrated or not) that is communicatively linked to the Network 730 in a distributed environment. Generally, the Interface 704 is operable to communicate with the Network 730 and includes logic encoded in software, hardware, or a combination of software and hardware. More specifically, the Interface 704 can include software supporting one or more communication protocols associated with communications such that the Network 730 or hardware of Interface 704 is operable to communicate physical signals within and outside of the illustrated Computer 702.

The Computer 702 includes a Processor 705. Although illustrated as a single Processor 705, two or more Processors 705 can be used according to particular needs, desires, or particular implementations of the Computer 702. Generally, the Processor 705 executes instructions and manipulates data to perform the operations of the Computer 702 and any algorithms, methods, functions, processes, flows, and procedures as described in the present disclosure.

The Computer 702 also includes a Database 706 that can hold data for the Computer 702, another component communicatively linked to the Network 730 (whether illustrated or not), or a combination of the Computer 702 and another component. For example, Database 706 can be an in-memory, conventional, or another type of database storing data consistent with the present disclosure. In some implementations, Database 706 can be a combination of two or more different database types (for example, a hybrid in-memory and conventional database) according to particular needs, desires, or particular implementations of the Computer 702 and the described functionality. Although illustrated as a single Database 706, two or more databases of similar or differing types can be used according to particular needs, desires, or particular implementations of the Computer 702 and the described functionality. While Database 706 is illustrated as an integral component of the Computer 702, in alternative implementations, Database 706 can be external to the Computer 702.

The Computer 702 also includes a Memory 707 that can hold data for the Computer 702, another component or components communicatively linked to the Network 730 (whether illustrated or not), or a combination of the Computer 702 and another component. Memory 707 can store any data consistent with the present disclosure. In some implementations, Memory 707 can be a combination of two or more different types of memory (for example, a combination of semiconductor and magnetic storage) according to particular needs, desires, or particular implementations of the Computer 702 and the described functionality. Although illustrated as a single Memory 707, two or more Memories 707 or similar or differing types can be used according to particular needs, desires, or particular implementations of the Computer 702 and the described functionality. While Memory 707 is illustrated as an integral component of the Computer 702, in alternative implementations, Memory 707 can be external to the Computer 702.

The Application 708 is an algorithmic software engine providing functionality according to particular needs, desires, or particular implementations of the Computer 702, particularly with respect to functionality described in the present disclosure. For example, Application 708 can serve as one or more components, modules, or applications. Further, although illustrated as a single Application 708, the Application 708 can be implemented as multiple Applications 708 on the Computer 702. In addition, although illustrated as integral to the Computer 702, in alternative implementations, the Application 708 can be external to the Computer 702.

The Computer 702 can also include a Power Supply 714. The Power Supply 714 can include a rechargeable or non-rechargeable battery that can be configured to be either user- or non-user-replaceable. In some implementations, the Power Supply 714 can include power-conversion or management circuits (including recharging, standby, or another power management functionality). In some implementations, the Power Supply 714 can include a power plug to allow the Computer 702 to be plugged into a wall socket or another power source to, for example, power the Computer 702 or recharge a rechargeable battery.

There can be any number of Computers 702 associated with, or external to, a computer system containing Computer 702, each Computer 702 communicating over Network 730. Further, the term "client," "user," or other appropriate terminology can be used interchangeably, as appropriate, without departing from the scope of the present disclosure. Moreover, the present disclosure contemplates that many users can use one Computer 702, or that one user can use multiple computers 702.

Described implementations of the subject matter can include one or more features, alone or in combination.

For example, in a first implementation, a computer-implemented method, comprising: receiving, a rule at a client application from an input text control, wherein the received rule comprises a sequence of characters; parsing the received rule into a plurality of tokens; for each token, configuring a plurality of behaviors associated with that token to generate behavior configurations, wherein each generated behavior configuration can be modified by an authorized user; and generating a UI control based on the behavior configurations.

The foregoing and other described implementations can each, optionally, include one or more of the following features:

A first feature, combinable with any of the following features, wherein the received rule is associated with a service-specific vocabulary, and wherein the vocabulary is generated from a descriptor file.

A second feature, combinable with any of the previous or following features, wherein parsing the received rule into a plurality of tokens comprises: dividing the received rule into a sequence of tokens; and reading the sequence of tokens and matching each of the tokens to a grammar rule.

A third feature, combinable with any of the previous or following features, comprising presenting each token and the behavior configurations associated with the token in a table control, wherein each row of the table control represents the token and the behavior configuration associated with the token.

A fourth feature, combinable with any of the previous or following features, wherein, for the received rule, a configuration of the generated UI control is variable.

A fifth feature, combinable with any of the previous or following features, wherein the configuration is based on a user type or a device type.

A sixth feature, combinable with any of the previous or following features, wherein each element of the generated UI control corresponds to a token.

In a second implementation, a non-transitory, computer-readable medium storing one or more instructions executable by a computer system to perform operations comprising: receiving, a rule at a client application from an input text control, wherein the received rule comprises a sequence of characters; parsing the received rule into a plurality of tokens; for each token, configuring a plurality of behaviors associated with that token to generate behavior configurations, wherein each generated behavior configuration can be modified by an authorized user; and generating a UI control based on the behavior configurations.

The foregoing and other described implementations can each, optionally, include one or more of the following features:

A first feature, combinable with any of the following features, wherein the received rule is associated with a service-specific vocabulary, and wherein the vocabulary is generated from a descriptor file.

A second feature, combinable with any of the previous or following features, wherein parsing the received rule into a plurality of tokens comprises: dividing the received rule into a sequence of tokens; and reading the sequence of tokens and matching each of the tokens to a grammar rule.

A third feature, combinable with any of the previous or following features, comprising presenting each token and the behavior configurations associated with the token in a table control, wherein each row of the table control represents the token and the behavior configuration associated with the token.

A fourth feature, combinable with any of the previous or following features, wherein, for the received rule, a configuration of the generated UI control is variable.

A fifth feature, combinable with any of the previous or following features, wherein the configuration is based on a user type or a device type.

A sixth feature, combinable with any of the previous or following features, wherein each element of the generated UI control corresponds to a token.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: receiving, a rule at a client application from an input text control, wherein the received rule comprises a sequence of characters; parsing the received rule into a plurality of tokens; for each token, configuring a plurality of behaviors associated with that token to generate behavior configurations, wherein each generated behavior configuration can be modified by an authorized user; and generating a UI control based on the behavior configurations.

The foregoing and other described implementations can each, optionally, include one or more of the following features:

A first feature, combinable with any of the following features, wherein the received rule is associated with a service-specific vocabulary, and wherein the vocabulary is generated from a descriptor file.

A second feature, combinable with any of the previous or following features, wherein parsing the received rule into a plurality of tokens comprises: dividing the received rule into a sequence of tokens; and reading the sequence of tokens and matching each of the tokens to a grammar rule.

A third feature, combinable with any of the previous or following features, comprising presenting each token and the behavior configurations associated with the token in a table control, wherein each row of the table control represents the token and the behavior configuration associated with the token.

A fourth feature, combinable with any of the previous or following features, wherein, for the received rule, a configuration of the generated UI control is variable.

A fifth feature, combinable with any of the previous or following features, wherein the configuration is based on a user type or a device type.

A sixth feature, combinable with any of the previous or following features, wherein each element of the generated UI control corresponds to a token.

Implementations of the subject matter and the functional operations described in this behavior can be implemented in digital electronic circuitry, in tangibly embodied computer software or firmware, in computer hardware, including the structures disclosed in this behavior and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware. Data processing hardware encompass all kinds of apparatuses, devices, and machines for processing data, including by way of example, a programmable processor, a computer, or multiple processors or computers. The computer can also be, or further include special purpose logic circuitry, for example, a central processing unit (CPU), a field programmable gate array (FPGA), or an application-specific integrated circuit (ASIC). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this behavior can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this behavior can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this behavior, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this behavior contains many specific implementation details, these should not be construed as limitations on the scope of any inventive concept or on the scope of what can be claimed, but rather as descriptions of features that can be specific to particular implementations of particular inventive concepts. Certain features that are described in this behavior in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving, a rule at a client application from an input text control, wherein the rule comprises a sequence of characters forming an expression formatted independently from an application logic;
   parsing the rule into a plurality of tokens;
   for each token, configuring a plurality of behaviors associated with a respective token to generate behavior configurations, wherein each behavior configuration is modifiable by an authorized user; and
   generating a UI control based on the behavior configurations of the plurality of tokens.

2. The computer-implemented method of claim 1, wherein the rule is associated with a service-specific vocabulary, and wherein the service-specific vocabulary is from a descriptor file.

3. The computer-implemented method of claim 1, wherein parsing the rule into a plurality of tokens comprises:
   dividing the rule into a sequence of tokens; and
   reading the sequence of tokens and matching each of the tokens to a grammar rule.

4. The computer-implemented method of claim 1, comprising presenting each token and the behavior configurations associated with the token in a table control, wherein each row of the table control represents the token and the behavior configuration associated with the token.

5. The computer-implemented method of claim 1, wherein, for the rule, a configuration of the UI control is variable.

6. The computer-implemented method of claim 5, wherein the configuration is based on a user type or a device type.

7. The computer-implemented method of claim 1, wherein each element of the UI control corresponds to a token.

8. A non-transitory, computer-readable medium storing one or more instructions executable by a computer system to perform operations comprising:
   receiving, a rule at a client application from an input text control, wherein the rule comprises a sequence of characters forming an expression formatted independently from an application logic;
   parsing the rule into a plurality of tokens;
   for each token, configuring a plurality of behaviors associated with a respective token to generate behavior configurations, wherein each behavior configuration is modifiable by an authorized user; and
   generating a UI control based on the behavior configurations of the plurality of tokens.

9. The non-transitory, computer-readable medium of claim 8, wherein the rule is associated with a service-specific vocabulary, and wherein the service-specific vocabulary is from a descriptor file.

10. The non-transitory, computer-readable medium of claim 8, wherein parsing the rule into a plurality of tokens comprises:
    dividing the rule into a sequence of tokens; and
    reading the sequence of tokens and matching each of the tokens to a grammar rule.

11. The non-transitory, computer-readable medium of claim 8, comprising presenting each token and the behavior configurations associated with the token in a table control, wherein each row of the table control represents the token and the behavior configuration associated with the token.

12. The non-transitory, computer-readable medium of claim 8, wherein, for the rule, a configuration of the UI control is variable.

13. The non-transitory, computer-readable medium of claim 12, wherein the configuration is based on a user type or a device type.

14. The non-transitory, computer-readable medium of claim 8, wherein each element of the UI control corresponds to a token.

15. A computer-implemented system, comprising:
    one or more computers; and
    one or more computer memory devices interoperably coupled with the one or more computers and having tangible, non-transitory, machine-readable media storing one or more instructions that, when executed by the one or more computers, perform one or more operations comprising:
        receiving a rule at a client application from an input text control, wherein the rule comprises a sequence of characters forming an expression formatted independently from an application logic;
        parsing the rule into a plurality of tokens;
        for each token, configuring a plurality of behaviors associated with a respective token to generate behavior configurations, wherein each behavior configuration is modifiable by an authorized user; and
        generating a UI control based on the behavior configurations of the plurality of tokens.

16. The computer-implemented system of claim 15, wherein the rule is associated with a service-specific vocabulary, and wherein the service-specific vocabulary is from a descriptor file.

17. The computer-implemented system of claim 15, wherein parsing the rule into a plurality of tokens comprises:
  dividing the rule into a sequence of tokens; and
  reading the sequence of tokens and matching each of the tokens to a grammar rule.

18. The computer-implemented system of claim 15, comprising presenting each token and the behavior configurations associated with the token in a table control, wherein each row of the table control represents the token and the behavior configuration associated with the token.

19. The computer-implemented system of claim 15, wherein, for the rule, a configuration of the UI control is variable, and wherein each element of the UI control corresponds to a token.

20. The computer-implemented system of claim 19, wherein the configuration is based on a user type or a device type.

* * * * *